United States Patent [19]
Raczynski

[11] Patent Number: 5,870,364
[45] Date of Patent: *Feb. 9, 1999

[54] DIGITAL OPTICAL DISC WITH WRITEABLE REGIONS AND OPTICAL DISC PLAYER FOR READING THE WRITEABLE REGIONS

[75] Inventor: Walter Raczynski, Arlington Heights, Ill.

[73] Assignee: Control Alt Design, Arlington Heights, Ill.

[ * ] Notice: The term of this patent shall not extend beyond the expiration date of Pat. No. 5,646,920.

[21] Appl. No.: 847,677

[22] Filed: Apr. 28, 1997

Related U.S. Application Data

[63] Continuation of Ser. No. 626,674, Apr. 2, 1996, Pat. No. 5,646,920, which is a continuation of Ser. No. 367,709, Jan. 3, 1995, abandoned.

[51] Int. Cl.$^6$ .................................................. G11B 5/09
[52] U.S. Cl. .................. 369/47; 369/33; 369/14
[58] Field of Search .................. 369/47, 33, 14, 369/32, 41, 48, 30, 59, 275.1, 275.3, 13, 58; 360/72.1, 72.2

[56] References Cited

U.S. PATENT DOCUMENTS

| | | | |
|---|---|---|---|
| 4,523,305 | 6/1985 | Cheeseboro | 369/33 |
| 4,677,604 | 6/1987 | Selby, III et al. | 369/33 |
| 5,282,187 | 1/1994 | Lee | 369/52 |
| 5,646,920 | 7/1997 | Raczynski | 369/47 |

Primary Examiner—Ali Neyzari
Attorney, Agent, or Firm—Banner & Witcoff Ltd

[57] ABSTRACT

An improved digital optical compact disc is disclosed which incorporates a further information storage element or area for storage and retrieval of track play selection information. The further storage area is comprised of defined information containing regions whose shading or alteration by the user indicates whether a corresponding track is to be skipped or played. An improved compact disc player reads the information containing defined regions and is capable of automatically selecting particular tracks for play. The information contained in the defined regions is stored in a format which is at-once visually-recognizable, machine-readable and manually-alterable.

5 Claims, 10 Drawing Sheets

DIGITAL OPTICAL DISC WITH WRITEABLE REGIONS AND OPTICAL DISC PLAYER FOR READING THE WRITEABLE REGIONS

This is a continuation of application Ser. No. 08/626,674 filed Apr. 2, 1996, now U.S. Pat. No. 5,646,420 which is a continuation of Ser. No. 08/367,709 filed Jan. 3, 1995, now abandoned.

BACKGROUND OF THE INVENTION

1. Field of the Invention

The present invention relates generally to the field of digital optical compact disc information storage devices and, more particularly, the present invention relates to an improved compact disc storage device which incorporates at least one further storage element or area for storing additional information in a format which is both visually recognizable and machine readable. The information in a preferred embodiment is related to selective retrieval and/or identification of particular information contained in the compact disc. A corresponding disc player which is capable of reading both the information digitally stored in the compact disc as well as the information which is contained in the further storage element or area is also disclosed.

2. Description of the Related Art

Conventional digital optical compact discs are generally known in the art and provide a reliable and convenient mechanism for storing and retrieving information. In conventional optical discs, information is stored digitally, usually on a single side of the disc. A plurality of holes or pits in the surface of the disc define the stored information, and a laser beam is used to scan the surface of the disc to provide an output representative of the stored information. While these conventional systems generally provide satisfactory information storage and retrieval capability, these devices and the systems which access the stored information would be greatly improved by a system which is capable of repeatedly retrieving a selected portion of that information once the selected information has been initially identified or selected. The ability to maintain information related to the selection and/or retrieval of particular information contained in the disc, on the disc, would greatly enhance the performance of existing systems and increase overall consumer satisfaction with digital optical compact disc products.

The shortcomings of conventional compact disc storage and retrieval systems are apparent from the manner in which information is currently selected for playback in these systems. In conventional compact optical discs and in particular those optical discs which contain audio information such as music, the sound information is digitally stored in read-only format by the disc manufacturer. In optical compact discs which contain sound recordings, each individual selection is stored in a separate location called a track and each track is designated by a track number. The sound recording stored in the particular track is usually identified by its title and artist either by pre-printed material on the disc or in material which accompanies the disc. In these systems, the disc user can only read the information stored within the disc with a compact disc player and the user typically is not able to store additional information on the disc. When a user selects a particular compact disc containing the desired information or sound recording which the user would like to hear, the user must either listen to all of the selections on the disc or manually enter programming information into the compact disc player identifying the particular track or tracks which the user would like to hear.

Most conventional compact disc players are capable of playing selected recordings from digital optical compact discs. These disc players allow the user to program his or her track preferences into the machine so that the machine may skip undesired selections and play only those tracks or selections which the user wishes to hear. The track selection information is typically temporarily stored in a memory of the player while the disc player proceeds to play the selected tracks from the particular disc. In conventional compact disc player systems which are capable of playing selections from more than one disc at a time, the user is generally able to choose from the various selections on each of the discs which are inserted into the player by identifying the disc through its position in the player and then subsequently identifying the particular tracks which the user wishes to hear. (e.g., a user may select the desired track for play as follows: disc number 1, tracking, 7, 10; disc number 2 tracks 3, 5, 8, etc.) These conventional programmable disc players require relatively complex programming steps with which the user must become familiar with in order to select the particular tracks on the disc or discs which the user wishes to hear.

One of the problems with these conventional systems is that a person who desires to hear only particular selections from a given disc is required to use the disc player as an interface for making the selections, and the selection information is lost once the disc player has played the particular selection[s] or after the machine is turned off. As noted, the selection programming process for these systems can be fairly complicated especially in systems which are capable of playing a number of discs at a time. Additionally, this process must be repeated each time the user would like to listen to a particular disc after it has been removed from the machine because the selection information is not maintained with the disc.

It has been recognized, however, that in most instances, the particular track or track selections which the user initially identifies for playing from a particular compact disc are the same selections which the user will select at a later time so that the ability to maintain the selection information is therefore desirable. This is due to the fact that most digital optical compact discs, like most albums, have filler material which most listeners usually do not enjoy hearing or a person using a compact disc system may have certain favorite selections from a disc which they particularly enjoy.

One proposed solution to the problems identified above is disclosed in U.S. Pat. No. 4,872,151 invented by Smith. This reference describes a conventional digital optical compact disc having a magnetic storage element in the form of a magnetic strip for storing order of play data for the compact disc. The magnetic strip is attached to the disc and the order of play data stored in the magnetic strip can be maintained with the disc. Although the solution proposed by Smith addresses some of the problems identified in the art, the Smith disclosure has numerous disadvantages.

First of all, the apparatus disclosed in Smith requires that a person using the system interface with the compact disc player system in order to identify the selection information for a particular disc. As noted, this process can be fairly complex especially for systems in which a number of discs may be programmed at the same time for play. Additionally, because the selection information is stored magnetically on the disc, there is a significant risk that the selection information could be inadvertently lost due to accidental contact with the magnetic media or by exposing the magnetic media to a magnetic field. The system disclosed in Smith is also undesirable because the selection information is not readily ascertainable from viewing the surface of the disc. In order for a person using the system disclosed in Smith to determine which selections have been selected for play on a given disc, the person must insert the disc into the disc player so that a magnetic head in the disc player can read the magnetically stored track selection information. One further disadvantage is that the system disclosed in Smith requires fairly complex additions to existing disc player circuitry for implementation, most notably, the Smith design requires that magnetic read and write heads be incorporated into the disc player as well as fairly complex software for control of the magnetic heads in order to write information to the disc and read information from the disc.

Thus, there remains a need in the art for a compact disc and disc player system which is capable of maintaining compact disc selection information along with the disc in a non-volatile format which is at once machine readable, visually recognizable and manually inscribable without the use of a player.

Accordingly, it is an object of the present invention to provide a further information storage element or area on conventional digital optical compact discs which allows user selection information to be maintained in non-volatile format on the disc.

It is a further object of the present invention to provide a system for automatically reading and controlling a disc player via selection information stored on a digital optical compact disc.

It is another object of the present invention to provide a simple mechanism by which a person may manually select particular tracks on a compact disc for playing without the use of a compact disc player.

It is another object of the present invention to provide a storage mechanism for the track selection information which is both visually recognizable and machine readable.

It is a further object of the present invention to provide a design for reading disc selection information which is both simple to use and economical to implement.

It is a further object of the present invention to provide a further storage element or area on conventional digital optical compact discs which is compatible with existing optical discs and which may be easily applied to existing discs.

Other objects and advantages of the present invention will become apparent from the following summary of the invention, the drawings, and the detailed description of the presently preferred embodiments.

SUMMARY OF THE INVENTION

The present invention eliminates the need for the user of a conventional compact digital audio disc to re-program a disc player with user selection information each time the user desires to access a particular selection or a number of selections from a given compact disc. The selection information is manually entered on the disc in a non-volatile format without the aid of the disc player. In a preferred embodiment, the additional information is recorded on the compact disc in a format which is both visually recognizable and machine readable. The information is stored on the same or opposite side of the disc as the optically recorded data but is located in an area which does not contain the read only optically stored data.

Most conventional compact discs have a centrally located region adjacent to the central aperture of the disc which does not contain information and which is suitable for locating the additional information storage area or element. Furthermore, currently all CD's are single sided, the upper surface being reserved for user-readable pre-printed data, graphics, etc. In a preferred embodiment, the disc selection storage element is comprised of defined information containing areas which are either light or dark in appearance so that a device such as an opto-interrupter which passes over the defined areas is able to determine whether or not the defined area is shaded or otherwise manually differentiated from its surroundings. The opto-interrupter "reads" the shading of the defined area and provides a digital output which indicates whether the defined area is either light or dark in appearance. Each defined area is associated with a corresponding audio track on the disc and the digital output from the optical interrupter for a corresponding defined area of a track determines whether or not the disc player will skip or play the particular track.

It is preferred that the defined information containing areas be radially located around the central aperture such that the center of each area is located at substantially the same distance from the center of the disc as are the others. This arrangement allows a single opto-interrupter to read each of the defined areas as the disc player spins the disc. One defined area, referred to as the synchronization region, is larger than each of the remaining defined areas in order to provide a synchronization pulse which is used to identify the relative position of the information containing areas on the disc (based on known timing information). The status of the first information containing defined area which passes the opto-interrupter after the synchronization region, determines whether the player will skip the first track on the disc and the status of each of the remaining defined areas which subsequently pass the opto-interrupter determine whether each of their corresponding subsequent tracks will be skipped or played.

Once the disc spins up to speed, the opto-interrupter looks for the largest reflective area which corresponds to the synchronization marker on the disc. Because the disc controller is aware of the rotational speed of the disc and label it therefore knows the approximate expected duration in system clock cycles for the synchronization pulse on the disc. Once the controller finds the synchronization pulse based on the duration of the signal from the opto-interrupter, the locations of each of the information containing defined areas are then determined with respect to the trailing edge of the synchronization region and with reference to the disc player system clock. The system is able to determine this information because each of the defined information containing areas are located at a fixed distance from one another. Although it is known that the rotational speed for conventional compact disc players is not constant, it is recognized that the changes which occur in rotational speeds for the disc are insignificant from one revolution to the next for the purpose of identifying the location of the defined information containing areas. Compact disc controller circuits are also aware of the instantaneous rotational velocity of the disc.

The information containing defined areas may either be manufactured into the disc by the disc manufacturer or they may be added at some time after the disc is manufactured. The ability to add the further storage element or area to existing discs allows the system to be compatible with existing discs simply by retrofitting the disc with the additional storage element or area. In the preferred embodiments of the present invention, the further storage element or area is either comprised of, or located on the surface of an adhesive backed plastic or paper label which may be attached with the adhesive to a principal surface of the disc, or the further storage element may be comprised of, or located on a hard plastic surface which snap-fits into, over or around the aperture of existing compact discs or alternatively, the defined information containing regions may be incorporated into the disc by the manufacturer.

In the first embodiment, the adhesive backed element is simply attached to the disc in a portion of the disc which does not contain the sound recording or other information. The adhesive label is an annular label which matches the area on the compact disc adjacent to the central aperture which does not generally contain the digitally encoded data or any other available surface on the upper side of the disc. In each embodiment, the surface of the defined information containing areas are of a composition, texture or structure such that they facilitate manual recording of selection information. In a preferred embodiment, the composition, texture or structure is suitable for receiving alteration or marking from a writing instrument such as a marker or grease pencil. In an alternate embodiment, the information containing defined areas are designed to receive tabs which may be added, removed or moved from or on the disc in order to identify which tracks will be played or skipped.

The user programs a particular compact disc by either removing or applying a tab to the compact disc or by filling in or erasing the defined areas on the label associated with the particular track to be skipped. One skilled in the art will appreciate that convention should dictate whether a lightened region or a darkened defined region indicates that a particular track should be skipped or played. Either choice will work equally well and it is understood that it is desirable to have all disc systems operate in a similar fashion so that a person may play the desired selections on any disc player system which incorporates the present invention.

In the present invention, compact disc players would be suitably equipped with an inexpensive opto-interrupter (conservatively a $.50 component) and therefore be able to detect the user-programming information and subsequently direct the disc player's controller circuitry to avoid the undesired tracks by issuing a "skip" command. The "skip" command is typically already part of a conventional compact disc player instruction set.

This improved digital optical compact disc and disc player allows the disc user to selectively identify particular tracks of a compact disc for play in a format which is both visually recognizable and machine-readable. The track selection information may be stored along with the disc in a non-volatile format and when the disc user wishes to hear the desired selections from the disc, the disc user only needs to insert the disc into a compatible disc player in order to play the desired selections. There is no longer a need to reprogram a disc player each time the user inserts any given disc into any suitably equipped player.

A "preferences" switch may also be incorporated within the player in order to enter enable or disable the preferences. When the preferences are disabled, the disc player ignores the selection information in the further storage area.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1A:
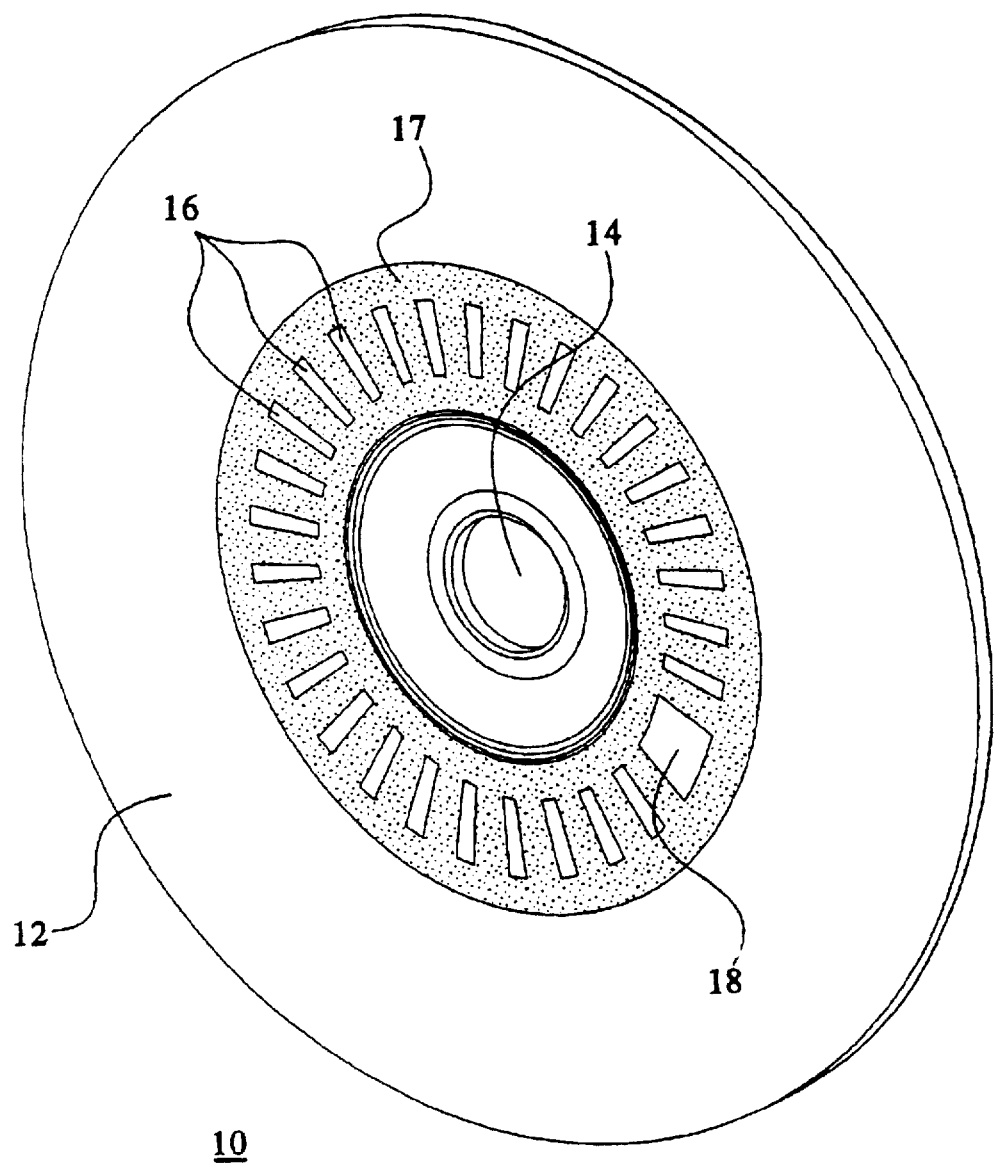
FIG. 1A is a perspective view of a new and improved optical compact disc in accordance with a first embodiment of the present invention wherein the further information storage area or element is comprised of a single ring of information containing defined areas manufactured into the surface of a compact disc.

An embodiment of the present invention is shown generally at 10 in FIG. 1A wherein an improved compact disc 12 having an aperture 14 has a further storage element or area comprised of a ring of information containing defined areas 16 radially surrounding the aperture 14. Each of the defined areas 16 are located at substantially the same distance from the center of aperture 14. The information containing defined areas 16 are located in a region of the digital optical compact disc which typically does not contain the optically stored information. The ring of information containing defined areas may be applied via an adhesive backed label or alternatively this region may be attached to a hard plastic base which snap-fits into the center aperture of the disc or additionally it may be a region which is incorporated into the disc at the time of manufacture as shown. The width and spacing between each of the defined areas 16 is substantially the same in the preferred embodiment so that the spatial relationship may be used to identify the defined areas as they pass under an opto-interrupter, the operation of which will be described in greater detail below. A shaded area 17 surrounds, separates and offsets the defined regions 16. A larger synchronization area 18 is located within the ring of information locations 16 at substantially the same distance from aperture 14 as the defined areas 16. The interval of the synchronization area 18 is approximately twice as long as that of the defined areas 16 so that it may be easily recognized as providing a synchronization pulse when the synchronization region 18 passes the opto-interrupter of a disc player of the present invention.

Figure 1B:
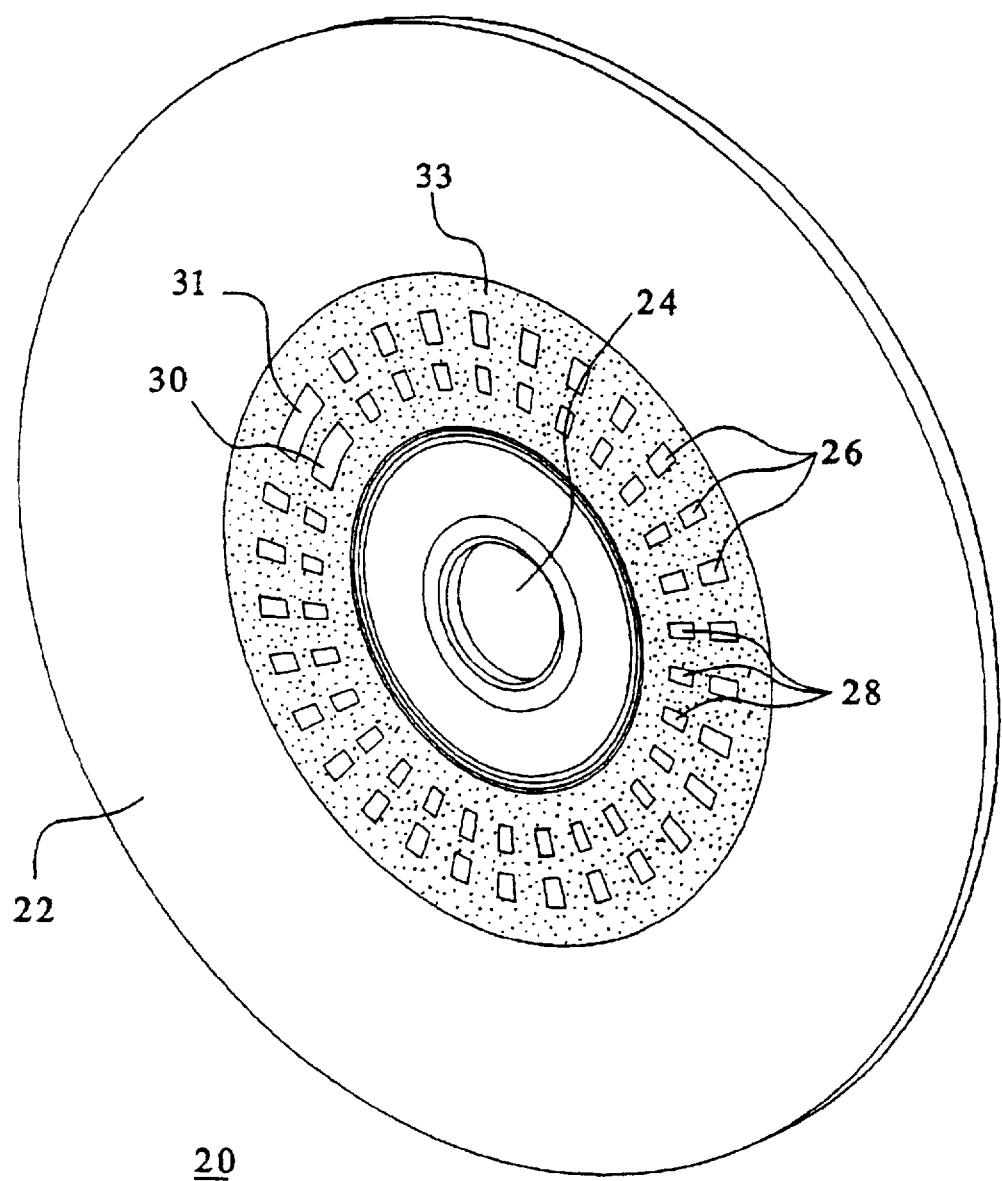
FIG. 1B is a perspective view of a second embodiment of the present invention wherein the further information storage area or element is comprised of a double ring of information containing defined areas manufactured into the surface of a compact disc.
Figure 1C:
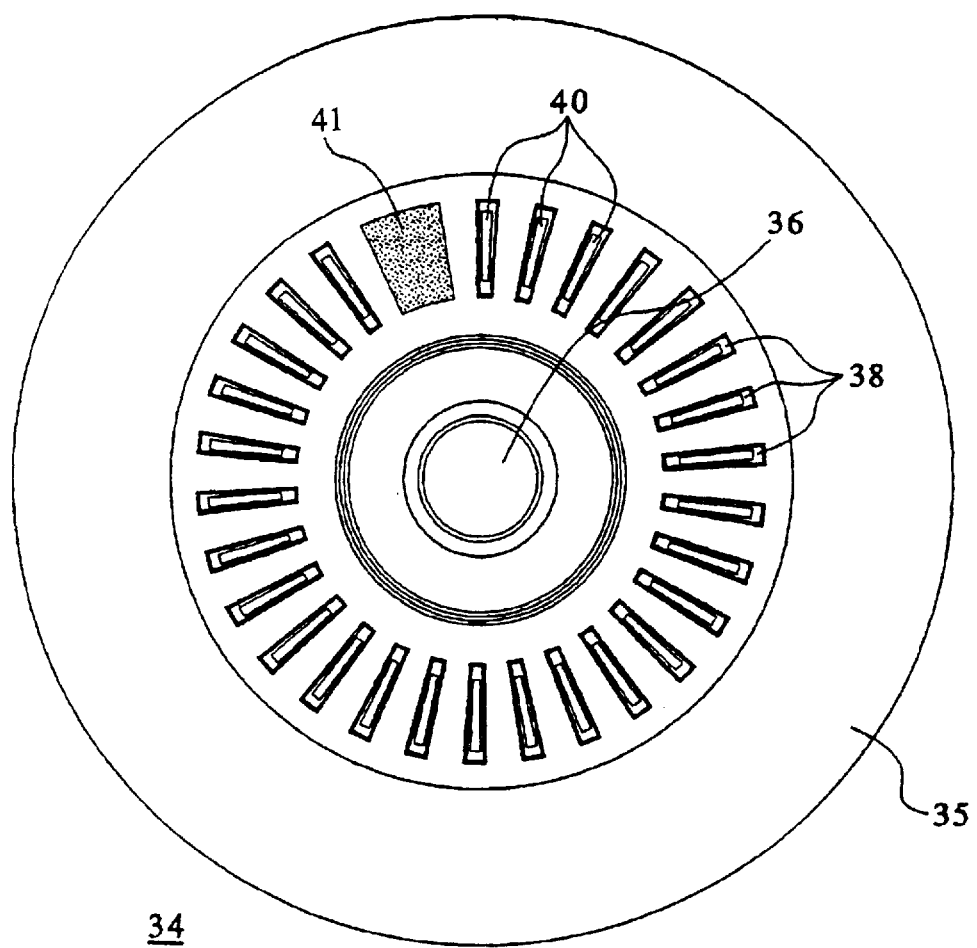
FIG. 1C is a top plan view of a new and improved compact disc in accordance with a further embodiment of the present invention wherein each of the information containing defined locations has a central markable region for identifying skip/play information.

FIG. 1B illustrates an alternate embodiment of the present invention which is shown generally at 20. In this embodiment, a compact disc 22 having an aperture 24 has a further storage element comprised of two rings of information containing defined areas 26,28 which surround the aperture 24. Outer ring of information containing defined areas 26 surrounds an inner ring of information containing defined areas 28. Outer and inner information synchronization regions 30 and 31 are also located within their respective rings. As with the previous embodiment, a shaded region 33 surrounds, separates and offsets each of the defined regions and synchronization regions. It is understood that this embodiment of the present invention allows greater storage capacity for the further storage element. In an alternate embodiment one of the rings may contain only timing information for defining the locations of the other ring. In this embodiment, as with the embodiment of the present invention illustrated in FIG. 1A, the outer and inner rings of defined information containing areas 26, 28 are located in a region of the disc adjacent to the aperture 24 which typically does not contain the audio data that is stored on a conventional compact disc. FIG. 1C illustrates a further embodiment, which is shown generally at 34, wherein a compact disc 35 having a centrally located aperture 36 has a ring of information containing defined areas 38 that surround the aperture 36. Each of the information containing locations 38 have inner markable regions 40 which are surrounded by a darkened border. A synchronization region 41 is also located in the ring of information containing sections as in the previously described embodiments. However, in this embodiment, the synchronization region is shaded so that the synchronization pulse will be low and the reference point will be based on the rising edge from the optical reader as will be described in more detail below. As with the previously illustrated embodiments of the present invention, the additional storage element is located in a region of the disc which typically does not contain the optically stored data. The arrangement of the information containing defined areas in each of the illustrated embodiments allows a single opto-interrupter located in the disc player to read the status of each of the defined areas on the disc or two-opto-interrupters in the case of the embodiment illustrated in FIG. 1B. The opto-interrupter "reads" the shading of the defined areas and provides a digital output which indicates whether the defined area is either light or dark in appearance. In the preferred embodiment of the present invention, each defined area is associated with a corresponding audio track on the disc and the digital output from the optical interrupter for the corresponding defined area of a track determines whether or not the disc player will skip or play a particular track. As noted, the synchronization region is approximately twice the interval of the remaining defined regions on the disc and is used to provide a synchronization pulse which is used to identify the positions of the remaining defined regions on the disc. The status of the first information containing defined region which passes the opto-interrupter after the synchronization region determines whether the first track of the disc will be skipped or played and the status of each of the remaining defined areas which subsequently pass the opto-interrupter determine whether each of their respective subsequent corresponding track selections will be skipped or played.

Figure 2A:
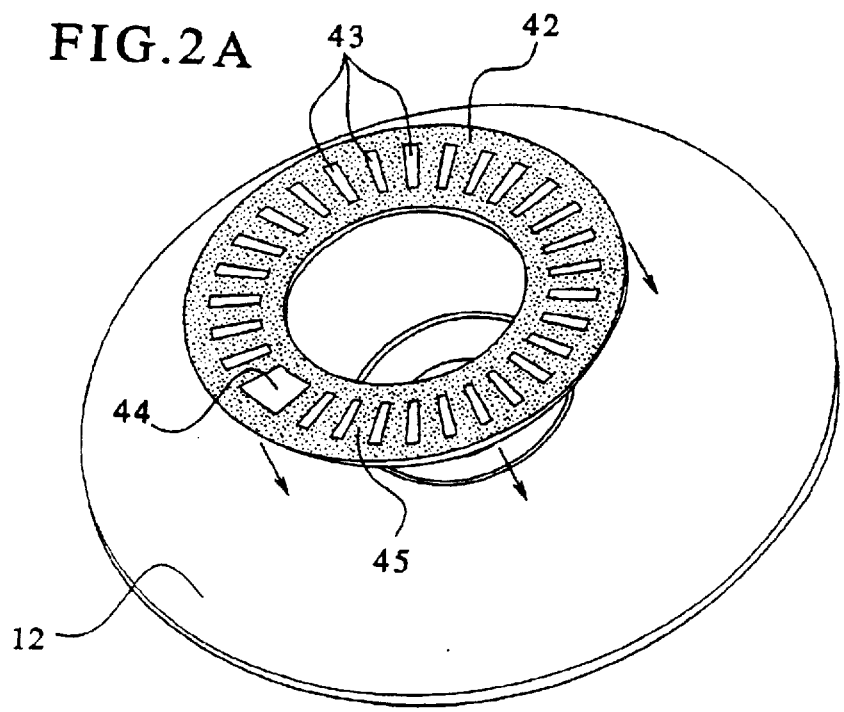
FIGS. 2A and 2B illustrate application of the further storage element to the surface of a compact disc wherein the storage element is embodied as an adhesive backed label.
Figure 2B:
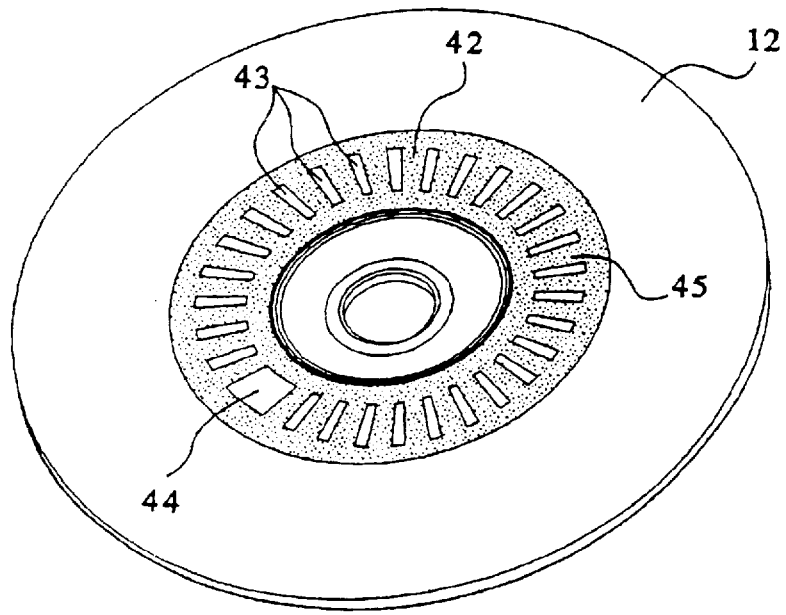
Figure 3:
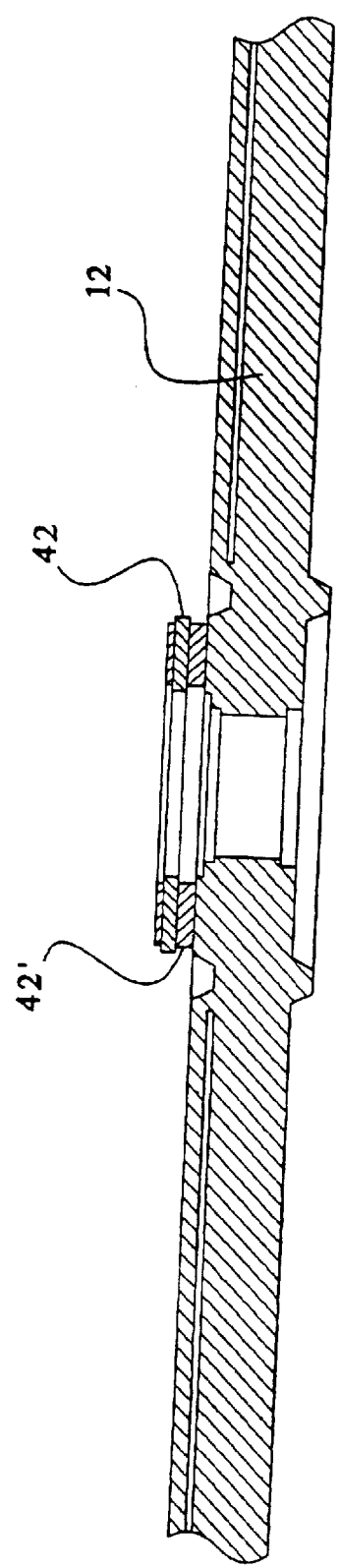
FIG. 3 illustrates a cross-sectional view of the further storage element similar to that illustrated in FIGS. 2A and 2B as applied to a compact disc but of a smaller diameter.

In the preferred embodiments of the present invention, the further storage element or area is either located on the surface of an adhesive backed plastic or glossy paper label which may be attached with the adhesive to the surface of the disc or the further storage element may be attached to a hard plastic base which snap-fits into the central aperture of a conventional compact disc or alternatively, the further storage area may be incorporated into the disc at the time of manufacture. FIG. 2A illustrates the application of an adhesive backed label 42 containing an embodiment of the further storage element. FIG. 2A illustrates the label 42 prior to application to the surface of disc 12. The label 42 is applied to an area which typically does not contain the read-only optically stored data on a conventional digital optical disc. As with the previous embodiment, the information containing defined regions 43 and synchronization region 44 are surrounded, separated and set off by a shaded region 45. FIG. 2B shows a label as applied to a compact disc. FIG. 3 illustrates a cross-sectional side view of a small diameter label as applied to the surface of the disc showing the label 42, label adhesive 42' and disc 12. In one embodiment of the present invention, the surface of the defined information containing regions such as 16, 26, 28, 40 and 43 are of a composition, texture or structure which is suitable for receiving marking from a marker or grease pencil or other alteration. The remaining areas of the further storage element are smooth so that they may not be readily marked or altered in order to eliminate stray marks which might degrade the performance of the system. As previously noted, in an alternate embodiment, tabs may be applied to or removed from the defined information containing areas in order to store the skip/play information for the tracks on the disc.

Figure 4:
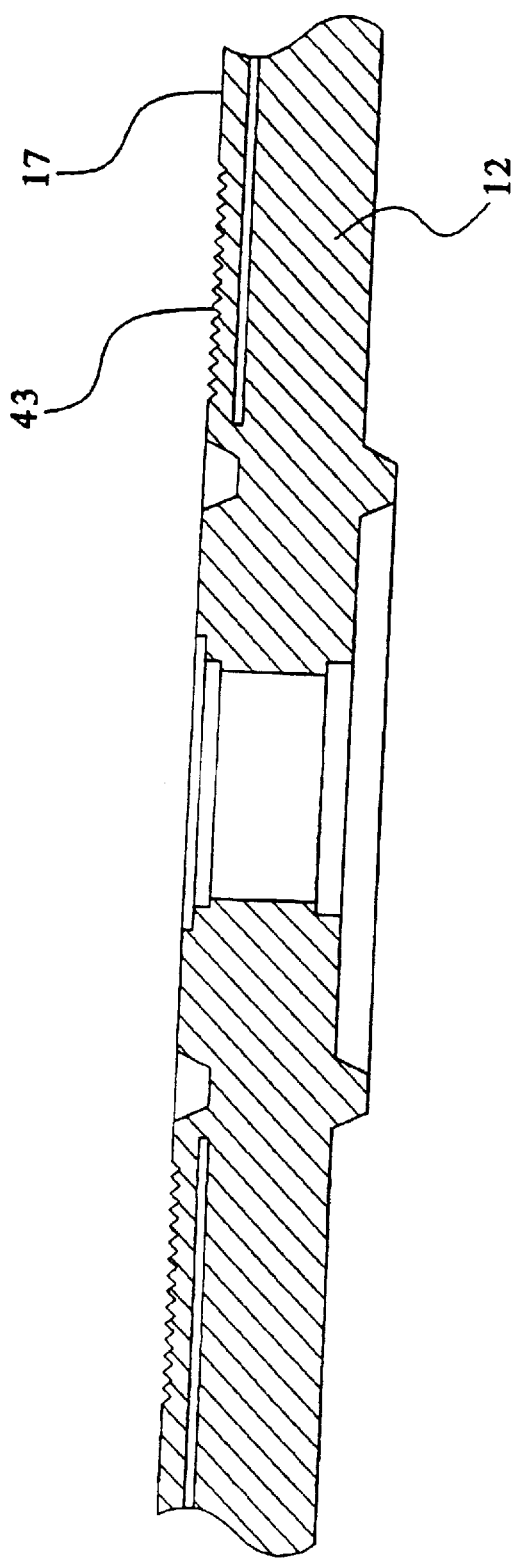
FIG. 4 illustrates a cross-sectional view of the embodiment of FIG. 1A wherein the further storage element is manufactured into the surface of the disc.
Figure 5:
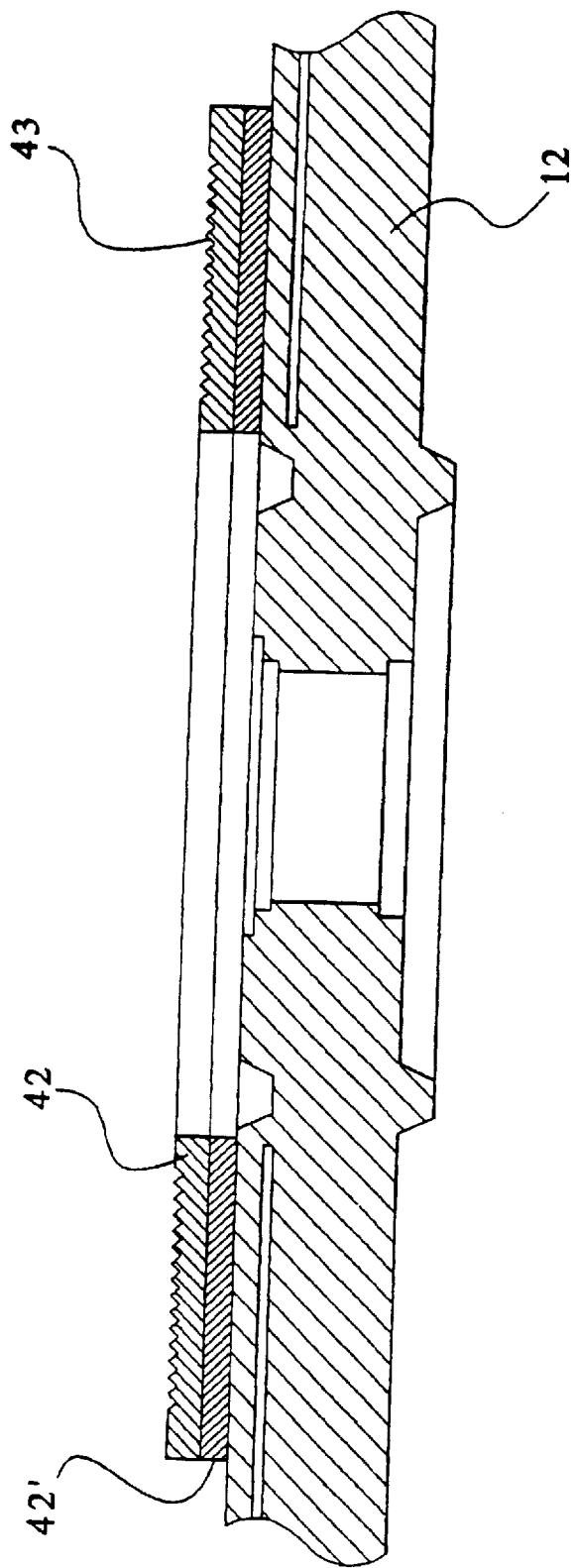
FIG. 5 illustrates a cross-sectional view of the embodiment illustrated in FIGS. 2A and 2B showing the textured surface for the defined regions.

FIG. 4 illustrates a cross-sectional view of the embodiment illustrated in FIG. 1 showing a possible surface structure for the defined regions which have been incorporated into the disc at the time of manufacture. In FIG. 4, the structure of the defined information containing areas is rougher than the adjacent smooth surface of the shaded region 17. The information containing regions 16, 18, 26, 28, 40 and 43 are such that they more readily receive the markings from a grease pencil or marker. The roughened surface of the defined information containing areas 43 contrasts with the smooth adjacent areas of the shaded portion of the storage element 17 which do not readily receive markings and the like. FIG. 5 illustrates a close-up cross-sectional view of an alternate embodiment of the device illustrated in FIGS. 2A and 2B showing the disc 12, label 42, adhesive 42' and defined region 43 wherein there is a larger diameter for the label. As with the previously illustrated embodiments, the roughened structure of the defined information containing region 43 is apparent from the drawing. It should be understood that the alternate embodiments of the present invention which employ moveable or removable tabs or the like to define the skip/play information for the disk do not necessarily require that the surface of the information containing regions 16 be ridged or roughened in order to receive markings. The tabs could also be attached with a "Post It" type adhesive thus allowing the tabs to be added to as well as removed from the surface of the information containing defined regions. The color or tonality of the tabs only needs to contrast with the typical color or shading of the information containing defined regions. It should also be understood that the systems could be mutually compatible wherein textured defined regions are receptive to the adhesive used in the tabs so that someone having only tabs or only a grease pencil could still use the system, thus increasing the overall usability and compatibility of the systems.

Figure 6:
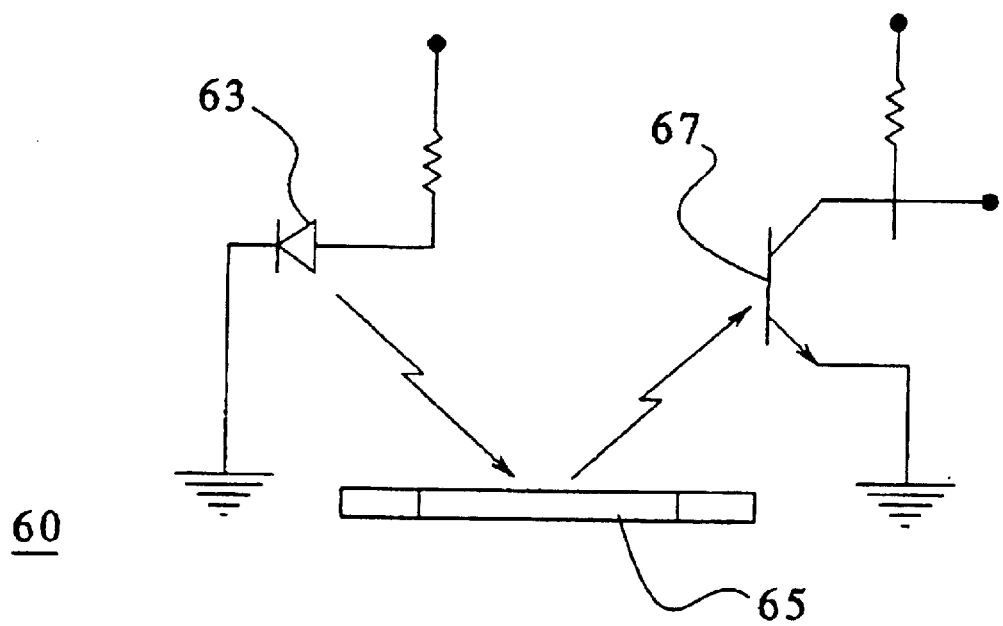
FIG. 6 illustrates a schematic diagram for a typical opto-interrupter for use with the present invention.

FIG. 6 illustrates an embodiment of a photo-interrupter for use with the present invention which is shown generally at 60. The photo-interrupter scans the disc with a photodiode 63 which transmits a steady beam of light onto the surface of the disc 65 where it is reflected onto phototransistor 67 when a reflective surface lies under the beam. The presence of light and dark regions at the surface of the disk 65 determine whether phototransistor 67 conducts and thus is capable of providing a digital output representative of the shading of the surface of the disc 65 which lies beneath the photo-transistor 63. The embodiment of the photo-interrupter shown in FIG. 6 is designed to reflect off the surface of the disc so that the photo-interrupter would necessarily be located above the surface of the rotating disc in a compact disc player which is capable of playing discs having a further storage element in accordance with the present invention. However, it should be understood that other types of photo-interrupters or light-sensitive devices are suitable for use with the present invention. Most notably, interrupters which pass light across a gap without reflecting off a surface are suitable for an embodiment which passes light through a transparent portion of an optical disc such as the central region of conventional digital optical compact discs. In a preferred embodiment of the present invention, the optical-interrupter is embodied as the GP2S05 or GP2S15 manufactured by Sharp Electronics of Japan.

Figure 7A:
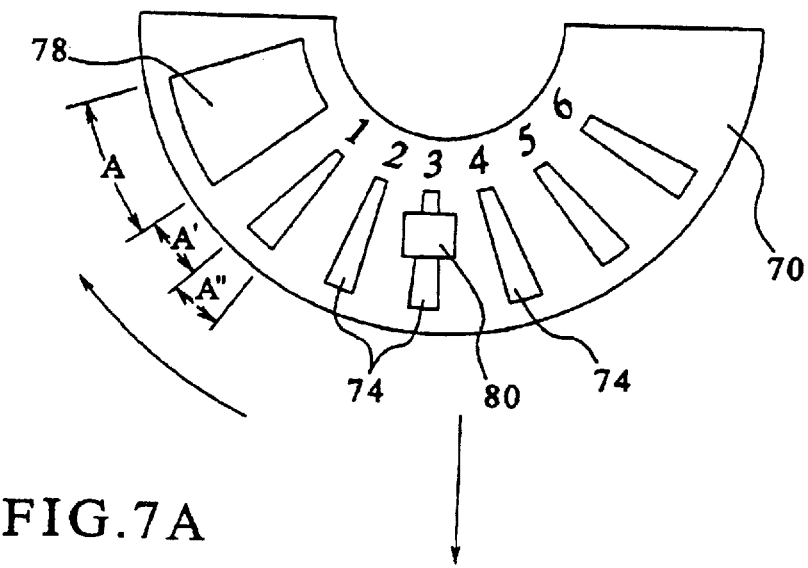
FIGS. 7A–7C illustrate operation of the present invention with respect to an exemplary embodiment and the corresponding output from the opto-interrupter.
Figure 7B:
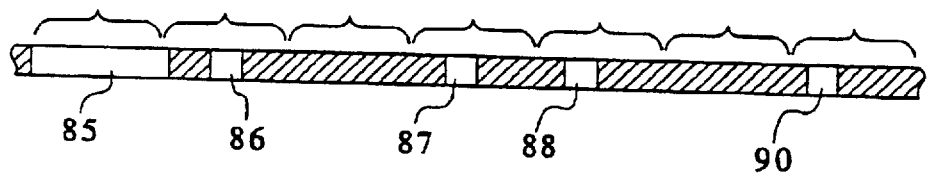
Figure 7C:
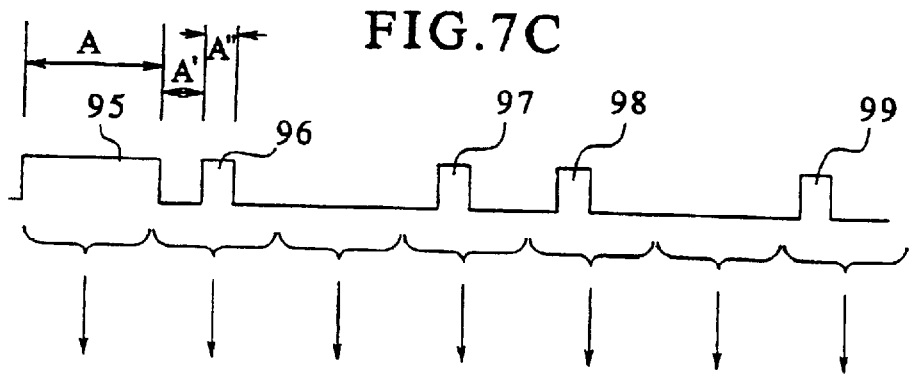

FIGS. 7A–C illustrate operation of the present invention with respect to the further storage element illustrated in FIG. 1A or 2A and 2B. The further storage element 70 is comprised of a darkened region containing a plurality of defined information containing locations 74 numbered consecutively from 1–6. A synchronization region 78 precedes defined information containing locations 74 as they pass under the opto-interrupter 80. FIG. 7B illustrates what the opto-interrupter 80 "sees" as the disc rotates beneath the opto-interrupter. Reflection 85 corresponds to the output produced by the synchronization region 78 and the remaining reflections 86, 87, 88 and 90 correspond to the unmarked regions for tracks 1, 3, 4, and 6 respectively. FIG. 7C illustrates the electronic output from the opto-interrupter 80. Digital pulse 95 corresponds to the output generated by the synchronization region 78 and the remaining digital pulses 96, 97, 98, 99 correspond to the output produced by the opto-interrupter from unmarked tracks 1, 3, 4 and 6 respectively. It will be appreciated by those skilled in the art that each of the alternate embodiments disclosed which employ application or incorporation of the information containing defined regions will function in a similar manner. It should also be understood that the scanning aspect of the invention will work just as well if the information containing regions are initially shaded dark rather than light, however, the use of initially light regions are easier to mark with a grease pencil or the like. The use of oppositely shaded tabs will work equally as well with either selection. Convention should dictate the selected format so that all disc player systems will use a similar format.

In the preferred embodiment, the invention employs the overall disc controller to execute play of the selected tracks. Because the system uses the overall system controller, it is aware and capable of controlling the rotational speed of the disc (and label) which is used in reading the information contained in the defined regions of the further storage element. The known period of rotation is first assigned the value of N clock pulses by the controller. Because:

1 Rotation=N clock pulses

N/360=One angular degree of rotation

N/90=four angular degrees of rotation, etc.

The number N is selected so that it is a whole number of system clock cycles. For example, at the moment that label reading begins; N may be assigned the value of 1440 which is 360×4 or consequently 4 clock cycles per angular degree of rotation. In the preferred embodiment, a synchronization region which has 16 degrees of arc therefore produces an output which is 64 clock cycles in duration (4×16). The 16 degree synchronization region is followed by an 8 degree border area which is thus 32 clock cycles in duration (4×8); followed by 28 defined user-markable information containing regions each having 4 degrees of arc which produce an output for 16 clock cycles and each of the information containing defined regions are separated by 28 border areas which are 8 degrees wide resulting in a separation of 32 clock cycles (8×4).

The rotational speed of the disc and the spatial relationship of the synchronization region and information-containing defined regions is then used to locate the user preference information on the disc. Once the trailing edge (or in the case of the opposite colored label, rising) of the 16 degree synchronization pulse passes the detector, the opto-interrupter is then able to read the contents of 28 information containing defined regions. For the sake of accuracy, the system clock is used to trigger a read from the opto-interrupter at the center of each information containing defined region thus obviating the potential for error from possibly reading an edge of the information containing defined region which might be poisoned by background color in the detector's field-of-view while also eliminating the effects of jitter or skew from any shock or vibration transmitted to the rotating disk and label.

In the example of the preferred embodiment, a clock period and rotational speed are chosen such that there are 1440 clock cycles per rotation upon initiation of reading the user preference information. These numbers have been selected as they are convenient, easily obtainable, and because they provide a sufficiently high degree of resolution (4 clock cycles per degree of revolution). The typical results for location of each of the information containing defined regions in terms of relative angle and clock cycles to center location are set forth in Table I below.

TABLE 1

| Region Trailing Edge - Synchronization Pulse | Angular Location of Center (Defined as 0 degrees) | Clock Pulses To Center Clock Ref. Reset = 0 |
|---|---|---|
| Track Region 1 | 10 degrees | 40 |
| Track Region 2 | 22 degrees | 88 |
| Track Region 3 | 34 degrees | 136 |
| Track Region 4 | 46 degrees | 184 |
| Track Region 5 | 58 degrees | 232 |
| Track Region 6 | 70 degrees | 280 |
| Track Region 7 | 82 degrees | 328 |
| Track Region 8 | 94 degrees | 376 |
| Track Region 9 | 106 degrees | 424 |
| Track Region 10 | 118 degrees | 472 |
| Track Region 11 | 130 degrees | 520 |
| Track Region 12 | 142 degrees | 568 |
| Track Region 13 | 154 degrees | 616 |
| Track Region 14 | 166 degrees | 664 |
| Track Region 15 | 178 degrees | 712 |
| Track Region 16 | 190 degrees | 760 |
| Track Region 17 | 202 degrees | 808 |
| Track Region 18 | 214 degrees | 856 |
| Track Region 19 | 226 degrees | 904 |
| Track Region 20 | 238 degrees | 952 |
| Track Region 21 | 250 degrees | 1000 |
| Track Region 22 | 262 degrees | 1048 |
| Track Region 23 | 274 degrees | 1096 |
| Track Region 24 | 286 degrees | 1144 |
| Track Region 25 | 298 degrees | 1192 |
| Track Region 26 | 310 degrees | 1240 |

TABLE 1-continued

| Region<br>Trailing Edge -<br>Synchronization Pulse | Angular Location<br>of Center<br>(Defined as 0 degrees) | Clock Pulses To Center<br>Clock Ref. Reset = 0 |
|---|---|---|
| Track Region 27 | 322 degrees | 1288 |
| Track Region 28 | 334 degrees | 1336 |

The preferred embodiment thus provides an easy procedure through which a conventional compact disc controller is able to read the user preference information from the defined information containing regions on the further storage element. The results are then read into the skip/play memory or register of the disc player which then proceeds to play only the selected tracks from the disc or discs which have been inserted into the player. Other labels are easily created which have differing numbers of user markable regions.

In an alternate embodiment, the disc player determines the user selection information "on the fly" without first defining the rotational speed of the disc. In this embodiment, the disc speed is used to define the number of clock cycles it takes to pass through the synchronization region. Once the disc spins up to speed after it has been inserted into a disc player, the disc controller in conjunction with the interrupter looks for the largest reflective area on the disc with reference to the system clock and identifies this region by noting that the opto-interrupter puts out a logical "1" for the greatest number of system clock cycles when this portion of the disc passes beneath the opto-interrupter. The disc controller then looks for the second occurrence of this region in order to determine the number of clock cycles necessary for one complete rotation of the disc. Once the precise number of clock cycles is known for complete rotation of the disc, the controller divides this number by 360 degrees to determine the number of clock cycles per degree. Once this value is determined, the system then determines the number of clock cycles to each of the defined information containing locations with reference to the synchronization pulse based on the known spacing in degrees of each of the defined information containing locations. The system controller then uses the trailing edge of the synchronization pulse as a reference point to determine at what point in time each of the centers of the defined information containing regions will pass beneath the opto-interrupter. The system controller then polls the output from the opto-interrupter at these times in order to determine whether the information containing region is either light or dark. This information is used in determining which of the tracks on the disc the user has selected to play. Similar detection schemes may be obtained via single or dual interrupt methodologies.

In the alternate embodiment of the invention illustrated in FIG. 1C, the system uses a similar procedure for locating the defined regions. In such a system, the system looks for the longest low output from the opto-interrupter corresponding to the sync pulse and then it locates the defined regions by timing the duration of each subsequent low output. The defined regions would have a fixed size in relation to the synchronization region so that the system could use this information to find each of the defined regions. For example, if the defined regions were ½ the size of the synchronization region, the system would check to determine whether the next low output had a duration greater than ⅓ the number of clock cycles for the duration of the synchronization pulse. If the next low out had a duration greater than this value, it would know that the defined region had been marked and would set the corresponding location in the skip register accordingly. The ⅓ value is selected to allow for timing errors in the system. (i.e. the system should look for a low value which is sufficiently greater than the duration of the low created by the border surrounding the defined region but which is also sufficiently lower than the low value corresponding to the duration of the complete defined region) The above values should adequately provide for any errors inherent in the system. If the next low following the synchronization pulse is less than the ⅓ value, it knows that the defined region has not been marked and will not time the next low (corresponding to the opposite border of the defined region) but it will examine the second low which corresponds to the leading edge of the next defined region. The system performs a similar evaluation of the remaining defined regions and loads appropriate values in the corresponding locations in the skip register accordingly. The skip register is a memory in the disc player which has memory locations associated with each of the tracks on the disc and which contains information defining whether each of the tracks on the disc will be skipped or played. The skip register is typically a volatile memory.

Figure 8:
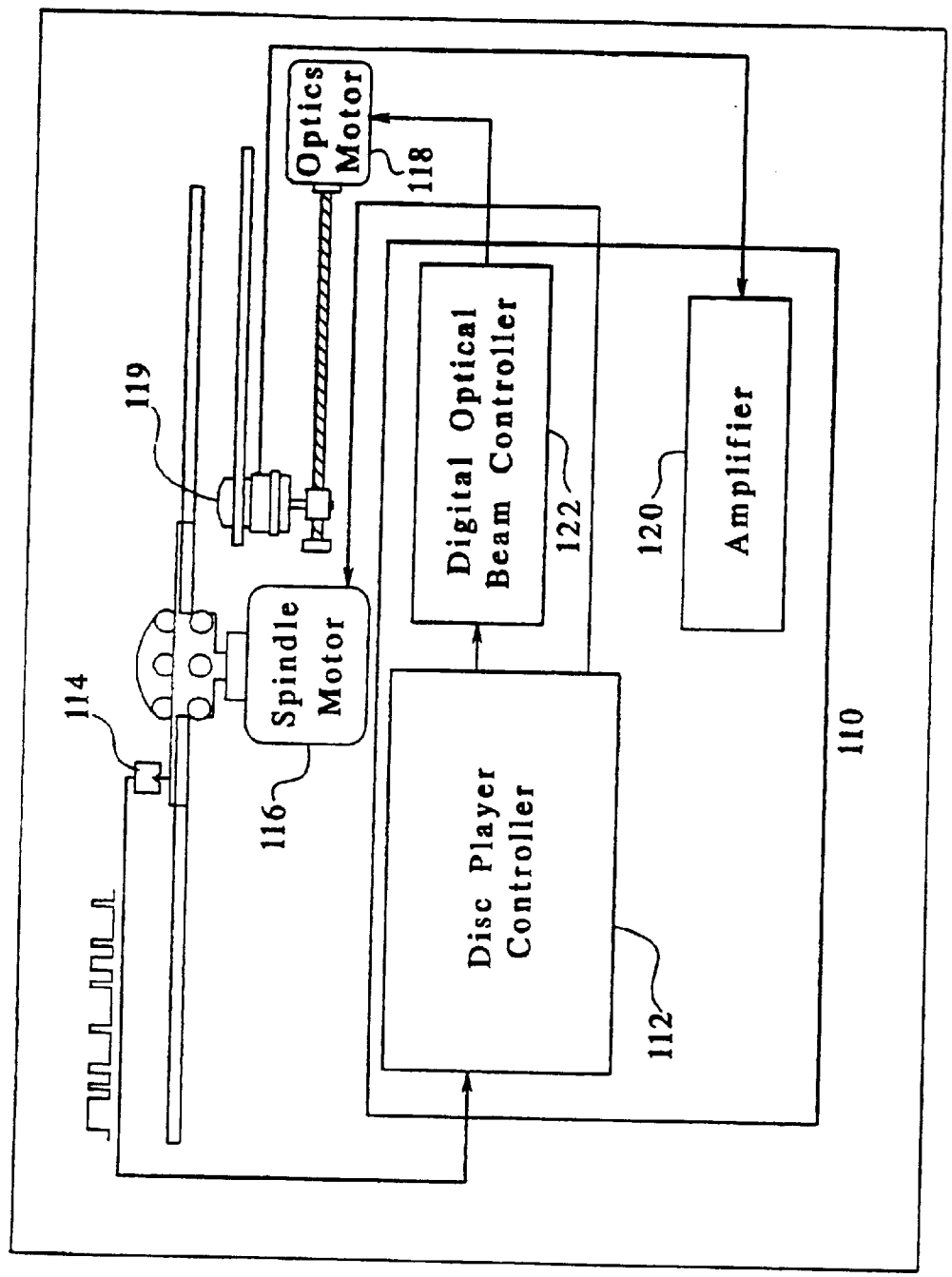
FIG. 8 is a block diagram illustration of an improved compact disc player which incorporates the present invention.

An improved digital optical disc player which incorporates the present invention is shown generally at 110 in FIG. 8. A disc player controller, 112 is connected to a defined information containing region scanner 114 and the disc player spindle motor 116. As previously discussed, the controller 112 operates in conjunction with the scanner 114 to determine which tracks on the disc will be selectively played. The disc controller, then operates in conjunction with the digital optical beam controller 122 to appropriately position the digital optical beam reader 119 via the optics motor 118 accordingly. Thus, only selected tracks are transmitted to the audio amplifier 120.

It will also be understood that as an alternate approach, slidable or otherwise movable plastic tabs may be used to define the information containing areas. Furthermore, any other visually recognizable, manually alterable mechanism will work equally as well. It is also contemplated that in the embodiment which employs adhesive labels or the like, the label may include a centrally located depressed region or embossment corresponding to the central aperture on the disc. The depressed region is used to properly position the label in the center of the disc and may be subsequently removed once the label is adhered to the disc. With such a device, the user simply positions the depressed central region in the disc aperture with his finger thereby ensuring rough concentricity of the lable to the central aperture of the disc. Alternatively, a simple tool having a platform to receive the label and a central cone which fits into the disc aperture for axially aligning the label to the disc may be used. In addition to using the further storage element or area for selective play of tracks on a disc, the information stored in the region may also include information related to classification of the type of disc. For example, in multiple disc players, a user may use certain of the defined information containing defined regions to classify the material on the disc. For example, the "code" 101 (light, dark, followed by light) might indicate a particular type of music. The user would be able to then select only the discs in the machine with the particular user classification. The machine would then select for play only those marked tracks on discs which have the appropriate classification.

The present invention is subject to many variations modifications and changes in detail. It is intended that all matter described throughout the specification an shown in the accompanying drawings be considered illustrative only.

Accordingly, it is intended that the invention be limited only by the spirit and scope of the appended claims.

I claim:

1. A digital optical disc comprising:

first and second sides and a center; and a plurality of defined regions containing information which is simultaneously both human and machine readable, said information being in a format which is manually alterable and located on the first side of the disc;

at least one further defined region containing synchronization information, said further defined region located substantially at a same radial distance from a center of the disc as the plurality of defined regions;

wherein said information is used to selectively access digitally encoded audio data stored on the disc.

2. The optical disc of claim 1, wherein said synchronization further defined region is in a format which is substantially not manually alterable.

3. A method of selecting a portion of audio information contained on a digital disc comprising the steps of:

a) providing a digital optical disc comprising a plurality of defined regions containing information which is simultaneously both human and machine readable, said information being in a format which is manually alterable and located on a first side of the compact disc, wherein said disc further comprises at least one further defined region containing synchronization information;

b) generating a first digital output representative of information contained in at least one of the plurality of defined regions by scanning the first side of the disc with a single scanner electrically connected to a disc player; and c) retrieving selected audio information from the disc based on the first digital output.

4. The method of selecting a portion of data contained on a digital disc of claim 3, wherein said synchronization defined region is located substantially at a same radial distance from a center of the disc as the plurality of defined regions.

5. The method of selecting a portion of data contained on a digital disc of claim 3, wherein the plurality of defined regions containing information are adjacent to one another and form a fist annular ring of spaced apart defined regions surrounding a center of the disc.

* * * * *